(12) United States Patent
McIntyre et al.

(10) Patent No.: US 9,002,675 B2
(45) Date of Patent: Apr. 7, 2015

(54) MAGNETO-INDUCTIVE POSITIONING USING A ROTATING MAGNETIC FIELD

(75) Inventors: Graham Mark McIntyre, Bedford (CA); Sebastien Bourdage, Lower Sackville (CA); Olivier Beslin, Eastern Passage (CA); Jean Pierre Quirion, Upper Tantallon (CA)

(73) Assignee: Ultra Electronics Maritime Systems Inc., Dartmouth (CA)

( * ) Notice: Subject to any disclaimer, the term of this patent is extended or adjusted under 35 U.S.C. 154(b) by 498 days.

(21) Appl. No.: 13/403,644

(22) Filed: Feb. 23, 2012

(65) Prior Publication Data

US 2013/0226512 A1 Aug. 29, 2013

(51) Int. Cl.
*G01C 9/00* (2006.01)
*G01R 33/00* (2006.01)
*G01S 3/02* (2006.01)
*G01V 3/08* (2006.01)

(52) U.S. Cl.
CPC ...................................... *G01V 3/081* (2013.01)

(58) Field of Classification Search
CPC ..... G01S 5/0263; G01S 5/0221; G01S 5/021; G01S 5/0009; G01S 5/06; G01S 5/10; G01S 5/14; G01S 5/22; G01S 19/13; G01S 19/26; G01S 1/042; G01S 1/045; G01S 3/146; G01R 33/02

USPC .............. 702/151, 57, 72, 75, 127, 150, 702/152–153, 155, 158–159; 324/200, 244, 324/260; 342/417, 450, 458
See application file for complete search history.

(56) References Cited

U.S. PATENT DOCUMENTS 6,549,004 B1 4/2003 Prigge
2011/0006774 A1 1/2011 Baiden

OTHER PUBLICATIONS

Nessler, N., Electromagnetic Location System for Trapped Miners, 2000, Subsurface Sensing Technologies and Applications, vol. 1, No. 2, pp. 229-246.*

(Continued)

*Primary Examiner* — Toan Le
(74) *Attorney, Agent, or Firm* — Hanley, Flight & Zimmerman, LLC

(57) ABSTRACT

A method and system for locating the position of a source that emits a rotating magnetic field. Three or more receivers are deployed or positioned in known position relative to each other, which may be along a common axis in some cases. Phase differences between the magnetic fields measured by the receivers are detected. The phase shifts are used to determine the location of the source. With three receivers, a range and bearing angle relative to a middle receiver may be determined. With five or more receivers, a range and two bearing angles may be determined, thereby providing a three-dimensional position.

22 Claims, 6 Drawing Sheets

(56) References Cited

OTHER PUBLICATIONS

Ayuso, et al., "Accurately Locating a Vertical Magnetic Dipole Buried in a Conducting Earth," IEEE Transactions on Geoscience and Remote Sensing, vol. 48, No. 10, Oct. 2010, 10 pages.

Prigge, et al., "Signal Architecture for Distributed Magnetic Local Positioning System," IEEE Sensors Journal, vol. 4, No. 6, Dec. 2004, 10 pages.

Raab, et al., "Magnetic Position and Orientation Tracking System," IEEE Transactions on Aerospace and Electronic Systems, vol. AES-15, No. 5, Sep. 1979, 10 pages.

Rantakokko, et al., "Accurate and Reliable Soldier and First Responder Indoor Positioning: Multisensor Systems and Cooperative Localization," Emerging Opportunities for Localization and Tracking, IEEE Wireless Communications, Apr. 2011, 9 pages.

Wrathall, p., et al., "Magneto-Inductive (MI) navigation in littoral environments," Proceedings col. 4039, Information Systems for Divers and Autonomous Underwater Vehicles Operating in Very Shallow Water and Surf Zone Regions II, Jody L. Wood-Putnam, Editors, Jul. 12, 2000, 8 pages.

\* cited by examiner

MAGNETO-INDUCTIVE POSITIONING USING A ROTATING MAGNETIC FIELD

FIELD

The present application generally relates to systems and methods for determining the position of an object and, in particular to determining a range and angle of the object from a set of receivers using a rotating magnetic field.

BACKGROUND

Remote position location systems are used in a wide range of applications. In some cases, GPS may be used to determine the position of a GPS-receiving device. In others, a terrestrial set of RF transceivers may communicate with the target object using RF communications and triangulation may be used to pinpoint the object's location. Various triangulation techniques exist and may rely upon signal strength, time-of-arrival, angle-of-arrival, or other such techniques. However, any of these techniques rely upon the target object being in an RF-friendly environment. GPS only functions correctly if the target object is able to receive RF GPS signals from satellites. RF triangulation only functions correctly if the target object is able to reliably receive the terrestrial RF signals without excessive attenuation or multi-path problems. In many environments, such as underwater, underground, or in-building, conventional position location systems are inoperable.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
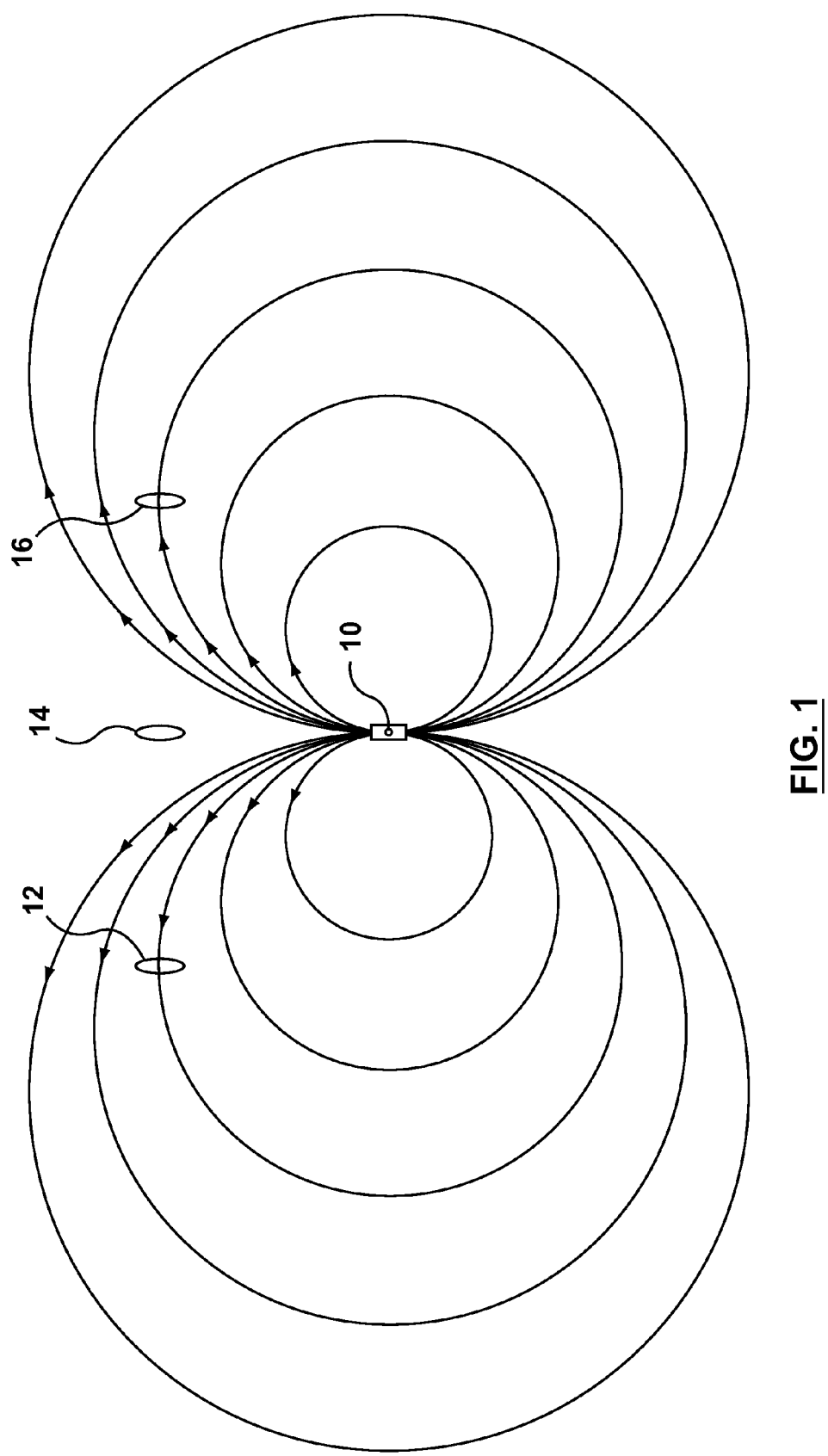
FIG. 1 shows a magnetic field produced by a magnetic source.

The present application describes a system and method for locating a source that emits a rotating magnetic field. The location may be determined in a two-dimensional plane in some cases, which may be sufficient for applications in which the source is known to be in a general area, such as within a pipe or mine shaft. In some cases, the system may be configured to sweep the two-dimensional plane so as to pin-point the source's location in three-dimensions. In yet other implementations, the location is determined in three-dimensional space. The systems and methods use phase difference in magnetic flux detected at spaced-apart receivers to determine the location of the source.

In one aspect, the present application describes a position locating system for determining the location of a source when the source emits a rotating magnetic field. The system includes three or more receivers, each configured to detect the rotating magnetic field, and wherein the receivers are spaced apart and the second receiver is positioned between the first and third receivers; and a signal processor configured to determine a distance of the source from the second receiver based upon a first phase difference between a detected magnetic field at the first receiver and a detected magnetic field at the second receiver, and a second phase difference between the detected magnetic field at the second receiver and a detected magnetic field at the third receiver.

In another aspect, the present application describes a method of determining the location of a source when the source emits a rotating magnetic field. The method includes positioning three or more receivers in spaced apart relation wherein the second receiver is positioned between the first and third receivers; at each receiver, generating a detected signal based on the rotating magnetic field; and determining a distance of the source from the second receiver based upon a first phase difference between the detected signal at the first receiver and the detected signal at the second receiver, and a second phase difference between the detected signal at the second receiver and the detected signal at the third receiver.

Other aspects and features of the present application will be understood by those of ordinary skill in the art from a review of the following description of examples in conjunction with the accompanying figures.

As noted above, conventional RF-based position locating systems are inoperable in certain environments in which signal attenuation or multi-path pose problems. Particularly challenging environments include underground, underwater or in-building environments.

Magnetic position location presents a promising option for position location in challenging or hostile environments. Magnetic fields tend to penetrate rock, water, soil, and other materials without the same attenuation problems encountered by electric fields.

There have been attempts to use magnetic position location, for example using a tri-axis receiver. A broadcast AC magnetic field at known location is sensed by the tri-axis receiver, which is then able to calculate its location relative to the known location based on the field strength sensed along the three orthogonal axes. This functions well unless there is conductive or magnetic material in the area. Conductive material interferes with the magnetic field by causing eddy field noise that may alter the field strength and direction, rendering signal strength measurements inaccurate. Magnetic materials interfere with position determination by distorting the direction of the field at the receiver location(s).

The present application presents a magnetic position locating system that does not rely upon signal strength/amplitude to determine the target's location/position. As will be described in detail below, the target provides a rotating magnetic field and three or more receivers in a known physical configuration rely upon relative phase differences to determine the location of the target.

Reference is first made to FIG. 1, which illustrates a magnetic field produced by a magnetic source 10. The magnetic source 10 may be a permanent magnet or may be a coil or loop of wire through which a current is passing. Also illustrated in FIG. 1 are three receivers 12, 14, 16, respectively. In this example, the receivers 12, 14, 16 are illustrated as coils or loops of antenna wire; however, it will be appreciated that the receivers may be any type of magnetometer, i.e. a device capable of sensing a magnetic field. The receivers 12, 14, 16

(coils, in this example) may each approximately lie in a plane substantially perpendicular to the two-dimensional image shown in the Figure; that is, the axis along which each receiver 12, 14, 16 senses the magnetic field is oriented horizontally in the illustration. It will be noted that the field lines at the middle receiver 14 are nearly perpendicular to the axis along which the receiver 14 senses magnetic field strength, meaning only a small signal is registered. The other two receivers 12, 16 are oriented such that their axes along which they sense magnetic field strength are nearly parallel to the field lines, resulting in significantly higher signals registered by receivers 12, 16.

If the magnetic source 10 were formed using a coil or loop of wire energized by an AC current, then the magnetic field lines shown in FIG. 1 may represent the peak magnetic field at one peak in the AC cycle. The field would then decay to zero and then build in the same pattern, but with opposite polarity. An AC magnetic field thus causes changes in flux sensed by the three receivers. The signals induced in the receiver coils 12, 14, 16 would have different magnitudes but there would be no phase difference. Each would decay and re-build at the same time.

Figure 2:
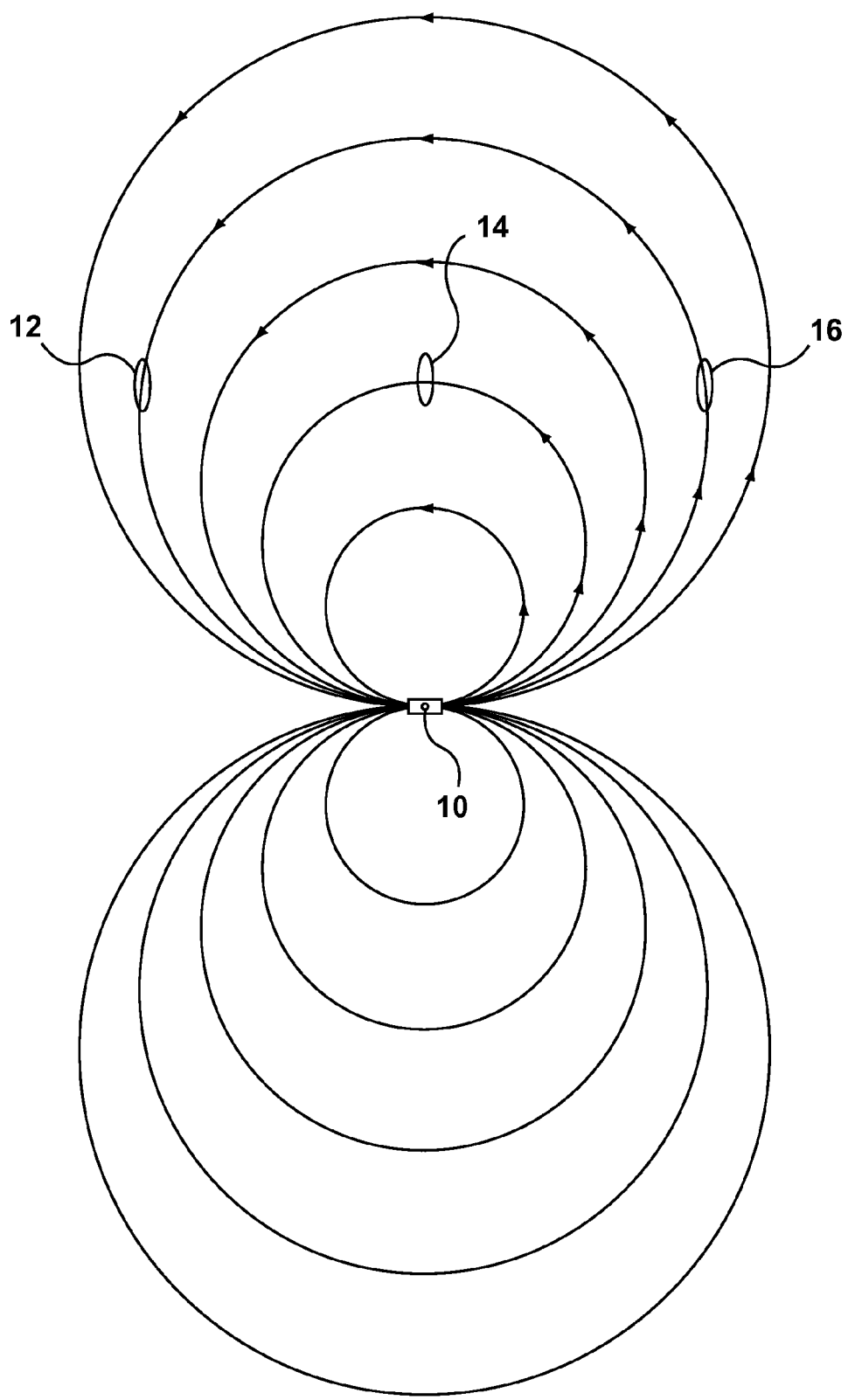
FIG. 2 illustrates the magnetic field produced by the magnetic source of FIG. 1 after it has been rotated 90 degrees clockwise.

Conversely, a rotating field is not characterized by decay to a "collapse" of the field and a subsequent building of the same field in opposite polarity. Reference is now made to FIG. 2, which illustrates the magnetic field produced by the magnetic source 10 of FIG. 1 after it has been rotated 90 degrees clockwise. It will be noted that the field lines passing through the middle receiver 14 are now nearly perpendicular to the coil, meaning significantly more flux is passing through that coil. The outside receivers 12, 16 receive less magnetic flux than previously, as indicated by the near-parallel field lines relative to the planes in which the coils lie.

As the field generated by the magnetic source 10 rotates, the magnetic field strength senses by each of the receivers 12, 14, 16 will vary cyclically with the frequency of the source rotation. However, there will be a phase shift between signals sensed at the three receivers 12, 14, 16. If the physical locations of the three receivers 12, 14, 16 are known, then this phase shift can be used to determine the location of the source relative to the receivers 12, 14, 16.

Figure 3:
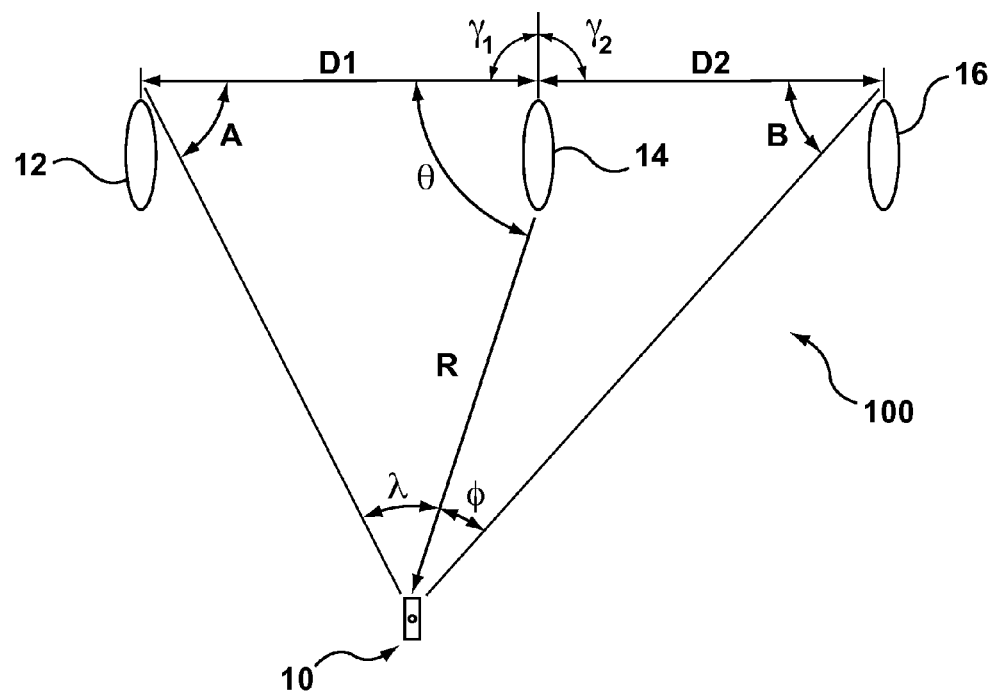
FIG. 3 diagrammatically shows a system for determining the location of a rotating magnetic source.

Reference is now made to FIG. 3, which diagrammatically shows a system 100 for determining the location of a rotating magnetic source 10. The source 10 may be a rotating permanent magnet, two orthogonal loops driven in quadrature, or any other device configured to produce a rotating magnetic field. The system 100 includes the three receivers 12, 14, 16. The source 10 is a distance R away from the middle receiver 14. The first receiver 12 is a distance D1 from the middle receiver coil 14, and the third receiver 16 is a distance D2 from the middle receiver 14. The line between the first receiver 12 and the middle receiver 14 lies at an angle $\gamma_1$ from an arbitrary y-axis, and the line between the third receiver 16 and the middle receiver 14 lies at an angle $\gamma_2$ from the arbitrary y-axis.

The source 10 at the distance R is at an angle $\theta$ from the line between the first receiver 12 and the middle receiver 14. The line from the first receiver 12 to the source 10 lies at an angle A with the line from the first receiver 12 to the middle receiver 14. Similarly, the line from the third receiver 16 to the source 10 lies at an angle B with the line from the third receiver 16 to the middle receiver 14.

At the source 10, the line between the source 10 and the first receiver 12 and the line between the source 10 and the middle receiver 14 are separated by an angle $\lambda$. The line between the source 10 and the third receiver 12 and the line between the source 10 and the middle receiver 14 are separated by an angle $\phi$. It will also be understood that the two angles $\lambda$ and $\phi$ correspond to the phase shifts between the signals at the respective receivers 12, 14, 16. That is, the angle $\lambda$ corresponds to the phase shift between the signals at the first receiver 12 and the middle receiver 14. The angle $\phi$ corresponds to the phase shift between the signals at the middle receiver 14 and the third receiver 16.

It will be understood that the distances between the receivers, D1 and D2, and the angles $\gamma_1$ and $\gamma_2$ are known quantities. The unknown quantities of interest are the distance R to the source 10 and the angle $\theta$ at which it lies. If these two quantities can be found, then the location of the source 10 in two-dimensional space is known.

The phase difference between signals at the first and middle receivers 12, 14, and the phase difference between signals at the middle and third receivers 14, 16, plus some trigonometric properties, allow for a solution to be found that provides the distance R and angle $\theta$ of the source from the middle receiver 14.

To simplify the example illustration, reference will now be made to FIG. 4, which shows a specific example of the system 100 shown in FIG. 3. In this example, the system 100 includes the three receivers 12, 14, 16 spaced equidistant; that is, distances D1=D2=D. Moreover, the three receivers 12, 14, 16 are arranged on a straight line; that is, angles $\gamma_1 = \gamma_2 = 90°$.

In order to solve for the distance R and the angle $\theta$, we can start with relating the known values using the sine law:

$$\frac{\sin\lambda}{D} = \frac{\sin A}{R} \quad (1)$$

$$\frac{\sin\varphi}{D} = \frac{\sin B}{R} \quad (2)$$

The angles A and B may be removed from Equations (1) and (2) by relating them to the angle of interest, $\theta$, using known angles $\lambda$ and $\phi$. The relations may be expressed as:

$$A = 180 - (\lambda + \theta) \quad (3)$$

$$B = 180 - \phi - (180 - \theta) = \theta - \phi \quad (4)$$

Equation (3) may be plugged into Equation (1), and Equation (4) may be plugged into Equation (2), and the resulting relations rearranged to solve for R as follows:

$$R = \frac{D\sin(\theta - \varphi)}{\sin\varphi} = \frac{D\sin(\lambda + \theta)}{\sin\lambda} \quad (5)$$

$$\frac{\sin\lambda}{\sin\varphi} = \frac{D\sin(\lambda + \theta)}{D\sin(\theta - \varphi)} \quad (6)$$

Equation (6) may then be set to zero and the roots found. Numerical methods may be used to determine the value of the angle $\theta$ that solves the zeroed equation (6). It will be noted that the distances between the receivers, D, cancels in this specific example; however more generically the distances may be different and will result in a ratio within Equation (6). Similarly, if the receivers 12, 14, 16 are not in a straight line, the angles $\gamma_1$ and $\gamma_2$ will need to be incorporated into the expressions and calculations above. It will be appreciated that the foregoing examples use trigonometric expressions and numerical methods to determine the source position/location. The formulas given above are but one example of a trigonometric solution and the present application is not limited to systems or methods that employ these specific expressions.

It will be understood that the receivers 12, 14, 16 may be oriented in any position and, if their relative positions are known, a mathematical solution may be found for the location of the rotating source. The precision of the solution may depend on the geometry of a given implementations; that is, the distances between the receivers, the bearing to the source, and the orientation of the receivers all impact the precision of the solution. In some anomalous configurations (for example, with a bearing approaching 90 degrees), the phase differences may be too difficult to detect such that a practical determination of the source location is not possible. In such a case, the orientation of the receivers may be varied by an operator until a more stable solution is possible. In some cases, the receivers may be configured to automatically adjust their relative positions to improve the precision of the determination of the source location.

It will also be appreciated that the axis of rotation of the source has a significant impact on the precision of the measurements at the receivers. In the ideal case, the source is rotating about an axis perpendicular to the line along which the receivers are generally located. If the source is oriented to rotate around an axis parallel to the axis on which the receivers are located, then it will not be possible to identify a phase difference. Re-orientation of the receivers relative to the rotating magnetic source would address this anomaly.

In another implementation, the receivers 12, 14, 16 may be configured to sense magnetic field strength along more than one axis. In one example implementation, the receivers 12, 14, 16 may each be tri-axis orthogonal receivers. In such an implementation, each receiver 12, 14, 16 may be configured to select the signal from the axis that has the largest magnitude signal. In more complex implementations, the receiver may be configured to combine the signals from the three axes, using a weighted average of the three signals. The term "magnetometer" as used in the present application is intended to include both single axis and multi-axes receivers.

In yet another embodiment, the position of the source may be determined using a Matched Field Processing algorithm. The Matched Field Processing algorithm uses a preconfigured model based on the receiver geometry and magnetic field expectations. The algorithm bases an estimate of the source location on the measured phases at the receivers using the model. The phase calculations given by the model are compared to the measured phase and adjustments are iteratively made to the source location estimate until the phase calculations match the measured phase differences at the receivers.

Figure 5:
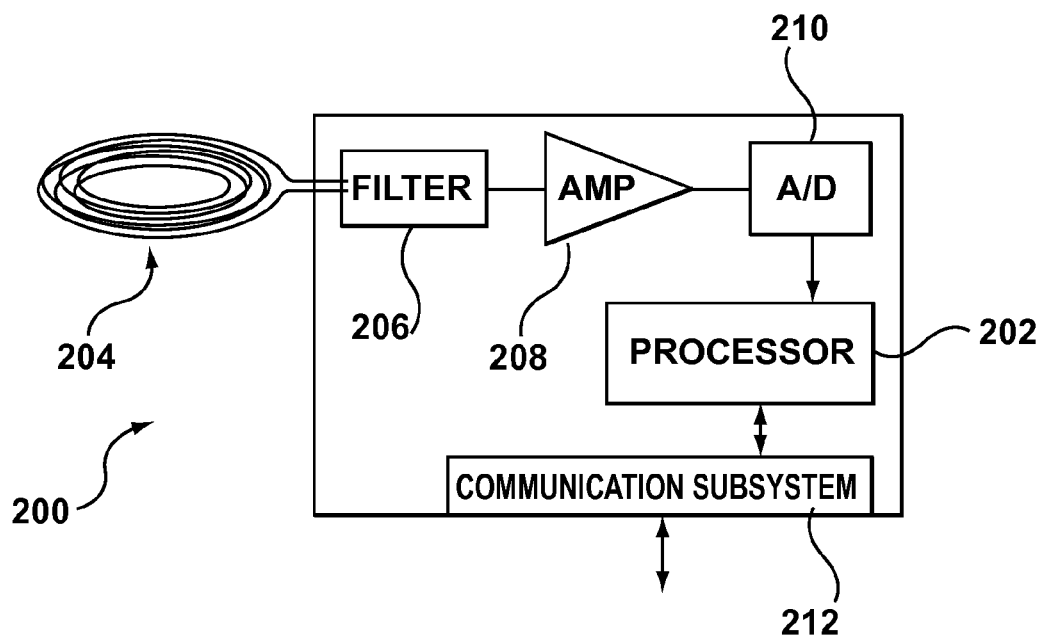
FIG. 5 shows a diagram of an example receiver.

Reference is now made to FIG. 5, which shows a diagram of an example receiver 200. The receiver 200 includes a processor 202 and a coil antenna 204. The coil antenna 204 may be formed from a coil of wire having one or more loops. It will be appreciated that the coil antenna 204 may include tuning elements to tune the antenna 204 to a particular frequency band. Although this embodiment of the receiver 200 includes a coil or loop antenna 204, the term "receiver" is to be understood more generically in the present application as referring to any magnetometer device.

In this embodiment, the receiver 200 may also include a signal receiving section connected to the coil antenna 204 for detecting and, in some cases, digitizing the signals induced in the coil antenna 204. In this embodiment, the receiver 200 signal receiving section includes a filter 206, an amplifier 208, and an analog-to-digital converter 210. The filter 206 may be implemented using a number of techniques and components. The filter 206 may be implemented as more than one filter in some embodiments. In some applications, the filter 206 may be implemented using passive analog components; however in some cases the filter 206 may be implemented in part using active components. The filter 206 may be implemented elsewhere in the signal path, including after digitization, and filtering may be applied in multiple locations in some cases. In general, the filter 206 may be a band-pass or low-pass filter configured to reject or suppress transient signals induced in the coil antenna 204 outside the operating frequency range of the rotating magnetic source. The frequency at which the system is designed to operate may be in the range 100 Hz to 5 kHz. If the source 10 is a rotating bar magnet, then the operating frequency may be lower, such as below 50 Hz. In general, the operating frequency is low enough to enhance the capability of penetrating various media but high enough to enhance inductive detection ability.

The filtered signal from the filter 206 in this example is then amplified using the amplifier 208 and the amplified signal is digitized by the analog-to-digital converter 210. The digitized signal may then be input to the processor 202. One or more of the filter 206, the amplifier 208 and the analog-to-digital converter 210 may operate under control of the processor 202 and may be configurable in their operation by way of commands signals from the processor 202.

The receiver 200 may also include a communication subsystem 212. The communication subsystem 212 may include components for transmitting and receiving signals from remote devices, including other receivers. The communication subsystem 212 may configured to communicate using wireless communication protocols, such as WiFi (e.g. IEEE 802.11 protocols), cellular (e.g. HPSA+, LTE, CDMA, GSM, GPRS, EDGE, etc.), short-range (infrared, Bluetooth™, etc.), or other wireless protocols. If configured to use a wireless protocol, then the communication subsystem 212 includes an antenna and associated components for implementing the communication protocol. In some embodiments, the communication subsystem 212 may be configured to communicate using a wired communication protocol, such as USB, Ethernet, etc. The communication subsystem 212, whether using wireless, wired, or both, sends and receives communications with remote devices. The communications may include transmission of the digitized signal, or data representing the digitized signal. A timestamp may be applied to the digitized signal.

In some embodiments, the processor 202 may be configured to engage in a time synch operation with remote receivers so as to establish a common reference time.

Figure 4:
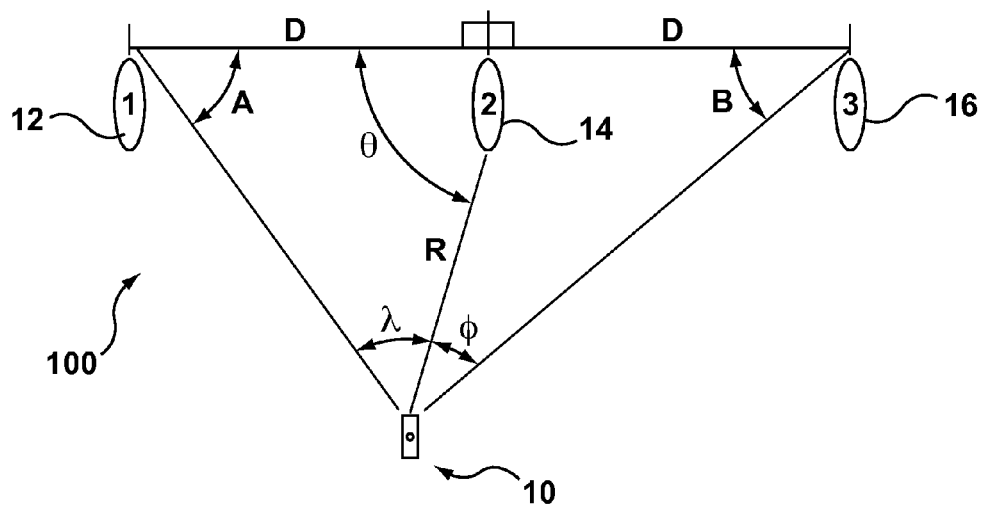
FIG. 4 shows an example variant of the system shown in FIG. 3.

In a system, such as the system 100 shown in FIG. 4, each receiver 200 may communicate with a central control device (not illustrated) configured to receive signal data (e.g. the digitized signal or data regarding the digitized signal) and to determine the phase differences between the signals detected at the various receivers 200. The central control device may be a dedicated special-purpose processing device, a personal computer, a handheld mobile device or tablet, or other computing device. In another embodiment, instead of a central control device, one of the receivers 200, such as the middle receiver, may act as a "master receiver" that receives signal data from the other receivers 200 and that determines the phase differences between the signals.

From the phase differences the central control device or master receiver (as the case may be) may be configured to determine the source position. Accordingly, the central control device or master receiver (as the case may be) may include input and output devices, such as a display screen and one or more input keys or a touchscreen. The range and or angle or other positional information may be displayed on the display screen once determined, and as updated with additional readings or reprocessing. The system may also be configured to display error or accuracy information in some embodiments.

Figure 6:
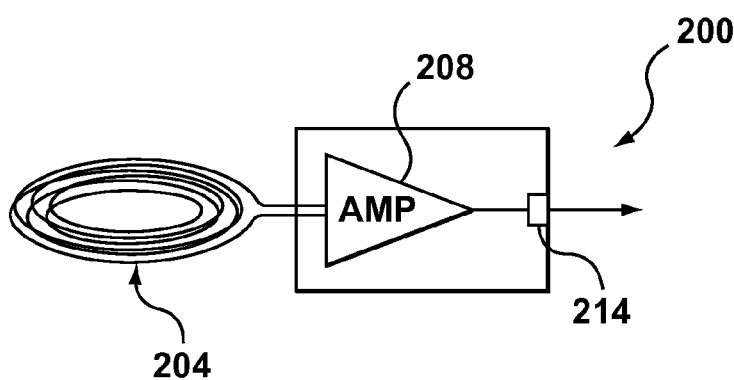
FIG. 6 illustrates another embodiment for the receiver.

FIG. 6 illustrates another embodiment for the receiver 200. In this embodiment, the receiver 200 includes the coil antenna 204 and the amplifier 208. The amplifier 208 amplifies the signal induced in the coil antenna 204. The amplifier 208 may, in in some embodiments, incorporate signal shaping or filtering aspects. An amplified signal is produced at the output of the amplifier 208. The receiver 200 includes an output port 214 through which the amplified signal is output. The amplified signal is transmitted from the output port 214 to either a central control device or the master receiver, as described above. The transmitted signal is an amplified analog signal that is digitized and filtered at the central control device or master receiver (as the case may be).

Figure 7:
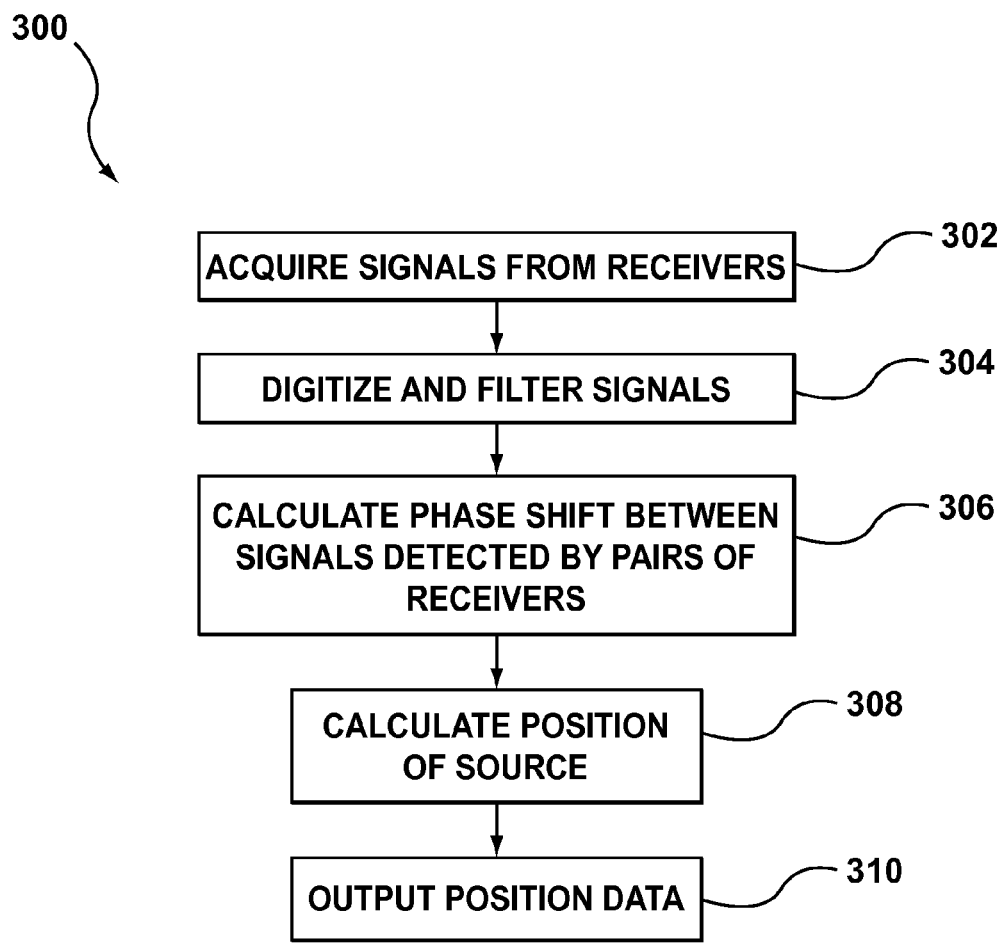
FIG. 7 shows, in flowchart form, an example method for determining the position of a rotating magnetic source.

Reference is now made to FIG. 7, which shows, in flowchart form, an example method 300 for determining the position of a rotating magnetic source. The method 300 includes an operation 302 of acquiring signals from the receivers and an operation 304 of digitizing and filtering those signals. As noted above, the signals may be sent in analog form from the receivers to a central processing/computing device, which may include one of the receivers in some embodiments, and the central processing/computing device may digitize and filter the signals. In another embodiment, each receiver may digitize and filter the signal detected at that receiver, and the digitized filtered signals may be transmitted from each receiver to the central processing/computing device.

In operation 306, the phase shift between pairs of receivers is calculated. A phase shift between each pair of signals is not necessarily calculated. For example, in the example system described above wherein there are three receivers, operation 306 may include calculating a first phase shift between the first receiver and the middle receiver, and calculating a second phase shift between the middle receiver and the third receiver. Some systems, examples of which are described below, may include more than three receivers. In these cases, more than two phase shifts may be calculated in operation 306.

Once the phase shifts are calculated, then in operation 308 the position of the source is determined. Operation 308 may include retrieving orientation or layout data from memory regarding the physical relations between the three (or more) receivers. For example, the distances between the receivers and their relative angles to each other may be factors in the calculation of the source position. The determined position may include a range or distance from one of the receivers, such as the middle receiver. The determined position may further include an angle relative to a predetermined coordinate axis. In one example, the predetermined coordinate axis is a line from the middle receiver to one of the other receivers. In some of the examples described below, more than one angle may be determined in operation 308, each measured from a respective axis. For example, two angles may be calculated with regard to a pair of respective axes (possibly orthogonal axes, but not necessarily). The pair of angles provides a three-dimensional coordinate position for the source. In another example, operation 308 may use a Matched Field Processing algorithm, as mentioned above.

The method 300 then includes an operation 310 of outputting position data. In one example, the position data may be output to a display screen or other graphical user interface. In some instances, it may output by transmission to another device.

The output of the position data may include display of the range/distance to the source and the angle data. The position data may be output in other forms or coordinate types. In some cases, the position data may be displayed graphically.

It will be understood that the above-described example using three receiver coils provides a two-dimensional location for the source. That is, it presumes that source lies in a particular two-dimensional plane, and the calculation gives a range/distance and bearing angle relative to the middle receiver. The concepts and principals discussed above may be extended so as to provide three-dimensional location, as will be described below.

Figure 8:
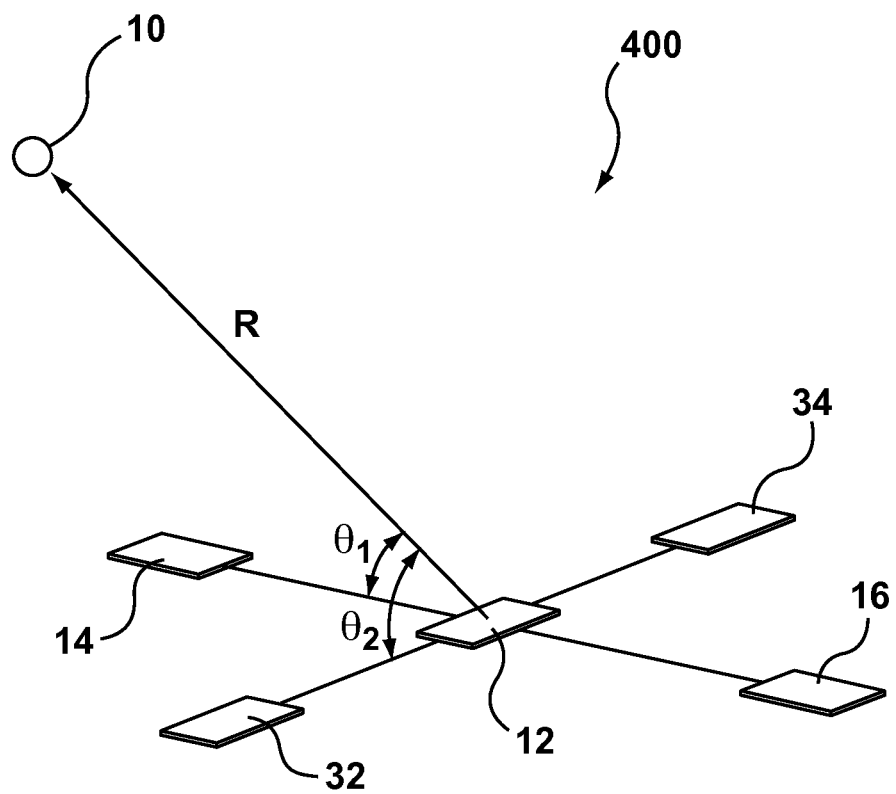
FIG. 8 shows an example system for determining a three-dimensional position of a rotating magnetic source.

Reference is now made to FIG. 8, which shows a system 400 for determining a three-dimensional position of a rotating magnetic source. The system 400 includes the first receiver 12, the middle receiver 14, and the third receiver 16, as described in other embodiments above. The first, middle and third receivers 12, 14, 16, are depicted as generally being in a straight line in this embodiment, although as discussed above they need not be in a straight line.

The system 400 further includes a fourth receiver 32 and a fifth receiver 36. The fourth receiver 32 and fifth receiver 36 are arranged with the middle receiver 14 between them, and are positioned to form a line roughly orthogonal to the line between the first and third receivers 12, 16. The fourth, middle, and fifth receivers 32, 14, 36, may be used in the same manner as described above with respect to the first, middle, and third receivers 12, 14, 16 to determine a range and bearing angle from the middle receiver 14 to the rotating source 10.

The system 400 may use calculation as described above to determine the distance R from the middle receiver 14 to the source 10. The system 400 also determines that the source 10 is at a first bearing angle $\theta_1$ relative to the line between the first receiver 12 to the middle receiver 14, and that the source is at a first bearing angle $\theta_2$ relative to the line between the fourth receiver 32 and the middle receiver 14.

In another possible embodiment, the three-coil system 100 described above with respect to FIG. 4, for example, may be configured to have the coils 12, 14, 16 pivot on the axis on which they are aligned so as to "sweep" through an arc of three-dimensional space. The readings at various bearing may be compared to determine the three-dimensional location of the source. In one embodiment, the bearing at which maximum amplitude is detected is determined to be the bearing at which the source lies in the two-dimensional plane. In another embodiment, an operator may vary the orientation of the receiver array to find an orientation that minimizes the jitter or scintillation in the calculated source location.

In yet another embodiment, each receiver coil, 12, 14, 16, may be mounted to a frame for the system 100, and the frame may have a known configuration so that the central computing/processing device or receiver is preprogrammed to know the relative distances and angles between the coils 12, 14, 16. In yet another implementation, the frame may be adjustable to change the relative position and orientation of the coils 12, 14, 16. The joints of such a frame may include sensors, such as rheostats or other such devices, that relay signals to the central computing/processing device or receiver such that the orientation of the coils 12, 14, 16 is detected and determined automatically. In yet a further implementation, each receiver may include a transmitter or receiver for sending a wireless signal to the other receivers for the purpose of ranging. Through wireless communications and ranging (e.g. ultrasonic or infrared, by way of example) the receivers may determine their relative orientation once they are deployed in an arbitrary location and configuration, and may thereby determine the geometry of their configuration and the resulting calculations required to determine the rotating magnetic source location.

The accuracy of the location determined for the source depends, in part, upon the range. It also depends, in part, upon the distance between the receivers and the angle of the source with respect to the receiver array (i.e. the bearing line). The degree of accuracy may be characterized mathematically in some cases. The accuracy may, in some embodiments, be displayed to the user along with the position/location measurement results. This may enable the user to determine whether to adjust configuration and positioning of the receiver array to improve the accuracy of the results.

In yet a further embodiment, the present system may be implemented as a network or array of surface-located receivers above an underground structure, such as a mine. The receiver locations may be pinpointed through RF ranging, GPS signals, or any other technique. The array may be constructed using a large number of receivers over a significant area, such as 1 km² in some cases. Personnel underground may be equipped with sources that produce rotating magnetic fields.

In one implementation, the range of the system may be extended by modulation of the source signal and use of a matched filter in the receivers.

Certain adaptations and modifications of the described embodiments can be made. Therefore, the above discussed embodiments are considered to be illustrative and not restrictive.

What is claimed is:

1. A position locating system for determining a location of a source, the system comprising:
    the source to emit a rotating magnetic field;
    three or more receivers, each to detect the rotating magnetic field, and wherein the three or more receivers are spaced apart and a second of the three of more receivers is positioned between a first of the three or more receivers and a third of the three or more receivers; and
    a signal processor to determine a distance of the source from the second receiver based upon a first phase difference between a detected magnetic field at the first receiver and a detected magnetic field at the second receiver, and a second phase difference between the detected magnetic field at the second receiver and a detected magnetic field at the third receiver.

2. The position locating system claimed in claim 1, wherein the signal processor is further configured to determine an angle between a line from the second receiver to the source and a line from the second receiver to the first receiver.

3. The position locating system claimed in claim 1, wherein the first, second, and third receivers are positioned along a common axis.

4. The position locating system claimed in claim 3, wherein the first and second receivers are spaced apart by a distance D, and wherein the second and third receivers are spaced apart by the distance D.

5. The position locating system claimed in claim 4, wherein the signal processor is further configured to determine an angle θ between a line from the second receiver to the source and a line from the second receiver to the first receiver, and wherein the signal processor is configured to determine the angle θ by finding a root of the expression:

$$\frac{\sin\lambda}{\sin\varphi} = \frac{D\sin(\lambda + \theta)}{D\sin(\theta - \varphi)}$$

wherein λ corresponds to the first phase difference, and φ corresponds to the second phase difference.

6. The position locating system claimed in claim 5, wherein the signal processor is configured to determine a distance R of the source from the second receiver based upon the expression:

$$R = \frac{D\sin(\theta - \varphi)}{\sin\varphi} = \frac{D\sin(\lambda + \theta)}{\sin\lambda}.$$

7. The position locating system claimed in claim 1, wherein each receiver is to generate a detected signal from its detected magnetic field, and wherein each receiver includes an amplifier for amplifying the detected signal, and wherein the signal processor includes an analog-to-digital converter for digitizing the amplified signal.

8. The position locating system claimed in claim 1, wherein each receiver is to generate a detected signal from its detected magnetic field, and wherein each receiver includes an analog-to-digital converter for digitizing the detected signal, and wherein the signal processor is to receive from each receiver that receiver's digitized signal.

9. The position locating system claimed in claim 1, wherein the three or more receivers further comprise a fourth receiver and a fifth receiver, and wherein the second receiver is positioned between the first and third receivers, and wherein the second receiver is positioned between the fourth and fifth receivers.

10. The position locating system claimed in claim 1, wherein the source is a permanent magnet configured to rotate about an axis.

11. The position locating system claimed in claim 1, wherein the source includes two orthogonal loops driven in quadrature.

12. The position locating system claimed in claim 1, wherein each receiver includes a coil antenna and wherein each receiver is to generate a detected signal based on current induced in the coil antenna by the rotating magnetic field.

13. The position locating system claimed in claim 1, wherein the signal processor is configured to determine a distance of the source from the second receiver using the first phase difference and the second phase difference in a Matched Field Processing algorithm.

14. A method of determining a location of a source when the source emits a rotating magnetic field, the method comprising:
    positioning three or more receivers in spaced apart relation wherein a second of the three or more receivers is positioned between a first of the three or more receivers and a third of the three or more receivers;
    at each receiver, generating a detected signal based on the rotating magnetic field; and
    determining a distance of the source from the second receiver based upon a first phase difference between the detected signal at the first receiver and the detected signal at the second receiver, and a second phase difference between the detected signal at the second receiver and the detected signal at the third receiver.

15. The method claimed in claim 14, wherein determining further comprises determining an angle between a line from the second receiver to the source and a line from the second receiver to the first receiver.

16. The method claimed in claim 14, wherein positioning includes positioning the first, second, and third receivers along a common axis.

17. The method claimed in claim 16, wherein the first and second receivers are spaced apart by a distance D, and wherein the second and third receivers are spaced apart by the distance D.

18. The method claimed in claim 17, wherein determining further comprises determining an angle θ between a line from the second receiver to the source and a line from the second receiver to the first receiver by finding a root of the expression:

$$\frac{\sin\lambda}{\sin\varphi} = \frac{D\sin(\lambda + \theta)}{D\sin(\theta - \varphi)}$$

wherein λ corresponds to the first phase difference, and ϕ corresponds to the second phase difference.

19. The method claimed in claim 18, wherein determining further comprises determining a distance R of the source from the second receiver based upon the expression:

$$R = \frac{D\sin(\theta - \varphi)}{\sin\varphi} = \frac{D\sin(\lambda + \theta)}{\sin\lambda}.$$

20. The method claimed in claim 14, wherein generating further comprises amplifying the detected signal to produce an amplified signal, and digitizing the amplified signal.

21. The method claimed in claim 14, wherein the three or more receivers further include a fourth receiver and a fifth receiver, and wherein positioning includes positioning the second receiver between the first and third receivers and positioning the second receiver between the fourth and fifth receivers.

22. The method claimed in claim 14, wherein determining the distance of the source from the second receiver includes using the first phase difference and the second phase difference in a Matched Field Processing algorithm.

* * * * *

UNITED STATES PATENT AND TRADEMARK OFFICE
CERTIFICATE OF CORRECTION

| | | |
|---|---|---|
| PATENT NO. | : 9,002,675 B2 | Page 1 of 1 |
| APPLICATION NO. | : 13/403644 | |
| DATED | : April 7, 2015 | |
| INVENTOR(S) | : McIntyre et al. | |

It is certified that error appears in the above-identified patent and that said Letters Patent is hereby corrected as shown below:

In the Claims

Column 9, Line 34 after "three" replace "of" with --or--

Signed and Sealed this
Twenty-first Day of July, 2015

Michelle K. Lee
*Director of the United States Patent and Trademark Office*